(12) United States Patent
Ni

(10) Patent No.: US 10,250,501 B2
(45) Date of Patent: Apr. 2, 2019

(54) SERVICE PACKET FORWARDING METHOD AND APPARATUS

(71) Applicant: Huawei Technologies Co., Ltd., Shenzhen (CN)

(72) Inventor: Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 100 days.

(21) Appl. No.: 15/410,885

(22) Filed: Jan. 20, 2017

(65) Prior Publication Data

US 2017/0134275 A1   May 11, 2017

Related U.S. Application Data

(63) Continuation of application No. PCT/CN2014/082809, filed on Jul. 23, 2014.

(51) Int. Cl.
*H04L 12/741* (2013.01)
*H04L 12/725* (2013.01)
*H04L 12/721* (2013.01)
*H04L 12/715* (2013.01)

(52) U.S. Cl.
CPC .......... *H04L 45/74* (2013.01); *H04L 45/306* (2013.01); *H04L 45/38* (2013.01); *H04L 45/64* (2013.01); *H04L 2212/00* (2013.01)

(58) Field of Classification Search
CPC ....... H04L 45/74; H04L 45/306; H04L 45/38; H04L 45/64; H04L 2212/00
See application file for complete search history.

(56) References Cited

U.S. PATENT DOCUMENTS

| 8,332,927 | B1 | 12/2012 | Shah | |
|---|---|---|---|---|
| 2005/0201274 | A1 | 9/2005 | Guerin et al. | |
| 2013/0163594 | A1 | 6/2013 | Sharma et al. | |
| 2013/0272305 | A1 | 10/2013 | Lefebvre et al. | |
| 2014/0362682 | A1* | 12/2014 | Guichard | H04L 41/5038 370/221 |
| 2016/0014016 | A1* | 1/2016 | Guichard | H04L 45/04 709/226 |

(Continued)

FOREIGN PATENT DOCUMENTS

| CN | 101009661 A | 8/2007 |
|---|---|---|
| CN | 103905447 A | 7/2014 |
| CN | 103929492 A | 7/2014 |

OTHER PUBLICATIONS

Quinn, P., et al., "Network Service Header," XP15097139, draft-quinn-sfc-nsh-02.txt, Feb. 14, 2014, 22 pages.

(Continued)

*Primary Examiner* — Ajay Cattungal
(74) *Attorney, Agent, or Firm* — Conley Rose, P.C.

(57) ABSTRACT

A service packet forwarding method and an apparatus, where the method includes receiving, by a classifier, a first service packet, generating, by the classifier, a second service packet according to a packet characteristic, and sending, by the classifier, the second service packet to a forwarder. Each piece of service chain information indicates a route of one service chain, a service packet carries multiple pieces of service chain information, and routes of multiple service chains constitute an entire path for forwarding the service packet.

20 Claims, 9 Drawing Sheets

(56) References Cited

U.S. PATENT DOCUMENTS

| | | | | |
|---|---|---|---|---|
| 2016/0099853 | A1* | 4/2016 | Nedeltchev | H04L 43/0852 370/253 |
| 2016/0119226 | A1* | 4/2016 | Guichard | H04L 45/00 370/392 |
| 2018/0013638 | A1* | 1/2018 | Guichard | H04L 67/10 |

OTHER PUBLICATIONS

Quinn, P., Ed., et al., "Service Function Chaining (SFC) Architecture," XP15098997, draft-quinn-sfc-arch-05.txt, May 5, 2014, 31 pages.
Foreign Communication From a Counterpart Application, European Application No. 14897917.2, Extended European Search Report dated Jun. 22, 2017, 10 pages.
Kojima, H., et al., "Service chaining methods for network function virtualization on carrier networks," IEICE Technical Report, vol. 113, No. 205, Sep. 5, 2013, pp. 13-18, 10 pages.
English Translation of Kojima, H., et al., "Service chaining methods for network function virtualization on carrier networks," IEICE Technical Report, vol. 113, No. 205, Sep. 5, 2013, 10 pages.
Naito, K., et al., "A Proposal of Efficient Service Function Chaining Identifier for Carrier Grade Network," Proceedings of the IEICE General Conference, Communication 2, Mar. 4, 2014, 5 pages.
English Translation of Naito, K., et al., "A Proposal of Efficient Service Function Chaining Identifier for Carrier Grade Network," Proceedings of the IEICE General Conference, Communication 2, Mar. 4, 2014, 5 pages.
Foreign Communication From a Counterpart Application, Japanese Application No. 2017-503602, Japanese Office Action dated Apr. 10, 2018, 2 pages.
Foreign Communication From a Counterpart Application, Japanese Application No. 2017-503602, English Translation of Japanese Office Action dated Apr. 10, 2018, 2 pages.
Machine Translation and Abstract of Chinese Publication No. CN101009661, Aug. 1, 2007, 16 pages.
Machine Translation and Abstract of Chinese Publication No. CN103929492, Jul. 16, 2014, 11 pages.
Foreign Communication From a Counterpart Application, PCT Application No. PCT/CN2014/082809, English Translation of International Search Report dated Apr. 29, 2015, 2 pages.
Foreign Communication From a Counterpart Application, PCT Application No. PCT/CN2014/082809, English Translation of Written Opinion dated Apr. 29, 2015, 8 pages.

* cited by examiner

SERVICE PACKET FORWARDING METHOD AND APPARATUS

CROSS-REFERENCE TO RELATED APPLICATIONS

This application is a continuation application of international patent application number PCT/CN2014/082809 filed on Jul. 23, 2014, which is incorporated by reference.

TECHNICAL FIELD

Embodiments of the present disclosure relate to the communications technologies, and in particular, to a service packet forwarding method and an apparatus.

BACKGROUND

In the communications field, various service function (SF) entities, a classifier, and a forwarder are deployed between a gateway general packet radio service (GPRS) support node (GGSN) and an external network.

As shown in FIG. 1, an uplink service packet sent from a GGSN to the Internet first passes through a classifier, and the classifier matches the service packet with a classification rule on the classifier. The service packet includes multiple packet characteristics, such as a source port number, a source Internet Protocol (IP), a destination port number, a destination IP, and a service type. The classification rule includes multiple entries. Each entry includes a matching condition, a service chain identifier (CID), a service index (SI), and a correspondence among a matching condition, a CID, and an SI. The matching condition includes all packet characteristics corresponding to the service packet, and target values respectively corresponding to all the packet characteristics. The matching condition is used to determine whether characteristic values of all the packet characteristics corresponding to the service packet respectively match target values corresponding to all the packet characteristics in the matching condition. The CID is used to identify a forwarding service chain. The SI is used to identify a quantity of SFs in the forwarding service chain corresponding to the CID. If all the packet characteristics corresponding to the service packet match a matching condition in an entry, the classifier encapsulates, into the service packet, a CID and an SI that are corresponding to the matching condition and that are in the entry, and sends, to a forwarder, the service packet into which the CID and the SI are encapsulated such that the forwarder forwards the service packet. The forwarder stores a forwarding rule, the forwarding rule includes identifier information of an SF, and the SF is the SF included in the service chain identified by the CID. The forwarder obtains, according to the CID carried in the service packet, a forwarding rule corresponding to the CID, and sends the service packet to the SF according to the identifier information that is of the SF and that is in the forwarding rule. For example, the forwarder sequentially sends the service packet to a function entity 1, a function entity 2, and a function entity 3 for processing, and then sends the service packet to an external network device.

In some approaches, if a packet characteristic corresponds to multiple target values, the packet characteristic needs to correspond to multiple matching conditions in a classification rule. Because each service packet belongs only to a specific service chain, each service packet can correspond only to one matching condition. When the packet characteristic corresponds to multiple target values, in order that all matching conditions are included, all permutations and combinations of possible target values need to be set in the classification rule. Consequently, entries of the classification rule and the forwarding rule drastically increase, and a large quantity of storage resources are occupied.

SUMMARY

Embodiments of the present disclosure provide a service packet forwarding method and an apparatus in order to reduce entries of classification rules and forwarding rules and save storage resources.

According to an aspect of the embodiments of the present disclosure, a classifier is provided and includes a first receiving module configured to receive a first service packet, where the first service packet includes a packet characteristic, a first processing module configured to generate a second service packet according to the packet characteristic, where the second service packet includes the first service packet and at least two pieces of service chain information, and each piece of service chain information is used to indicate a route of one service chain, and a first sending module configured to send the second service packet to a forwarder such that the forwarder forwards the second service packet according to the at least two pieces of service chain information.

According to another aspect of the embodiments of the present disclosure, a forwarder is provided and includes a second receiving module configured to receive a second service packet sent by a classifier, where the second service packet includes a first service packet and at least two pieces of service chain information, each piece of service chain information is used to indicate a route of one service chain, the first service packet is a packet received by the classifier, and the first service packet includes a packet characteristic, and a second sending module configured to forward the second service packet according to the at least two pieces of service chain information.

According to another aspect of the embodiments of the present disclosure, a classifier is provided and includes a third receiving module configured to receive a third service packet, where the third service packet includes a backhaul service packet and first service chain information, and the first service chain information is used to indicate a route of a first service chain, a third processing module configured to generate a fourth service packet according to the first service chain information and a packet characteristic of the backhaul service packet, where the fourth service packet includes the backhaul service packet and second service chain information, and the second service chain information is used to indicate a route of a second service chain, and a third sending module configured to send the fourth service packet to a forwarder such that the forwarder forwards the fourth service packet according to the second service chain information.

According to another aspect of the embodiments of the present disclosure, a forwarder is provided and includes a fourth receiving module configured to receive a fourth service packet sent by the classifier, where the fourth service packet includes a backhaul service packet and second service chain information, and the second service chain information is used to indicate a route of a second service chain. The fourth service packet is a packet generated by the classifier according to first service chain information and a packet characteristic of the backhaul service packet, and the first service chain information is used to indicate a route of a first service chain. The first service chain information and the backhaul service packet are information carried in a third service packet received by the classifier, and a fourth sending module configured to forward the fourth service packet according to the second service chain information.

According to another aspect of the embodiments of the present disclosure, a service packet forwarding system is provided and includes the classifier and/or the forwarder.

According to another aspect of the embodiments of the present disclosure, a service packet forwarding method is provided and includes receiving, by a classifier, a first service packet, where the first service packet includes a packet characteristic, generating, by the classifier, a second service packet according to the packet characteristic, where the second service packet includes the first service packet and at least two pieces of service chain information, and each piece of service chain information is used to indicate a route of one service chain, and sending, by the classifier, the second service packet to a forwarder such that the forwarder forwards the second service packet according to the at least two pieces of service chain information.

According to another aspect of the embodiments of the present disclosure, a service packet forwarding method is provided and includes receiving, by a forwarder, a second service packet sent by a classifier, where the second service packet includes a first service packet and at least two pieces of service chain information, each piece of service chain information is used to indicate a route of one service chain, the first service packet is a packet received by the classifier, and the first service packet includes a packet characteristic, and forwarding, by the forwarder, the second service packet according to the at least two pieces of service chain information.

According to another aspect of the embodiments of the present disclosure, a service packet forwarding method is provided and includes receiving, by the classifier, a third service packet, where the third service packet includes a backhaul service packet and first service chain information, and the first service chain information is used to indicate a route of a first service chain, generating, by the classifier, a fourth service packet according to the first service chain information and a packet characteristic of the backhaul service packet, where the fourth service packet includes the backhaul service packet and second service chain information, and the second service chain information is used to indicate a route of a second service chain, and sending, by the classifier, the fourth service packet to a forwarder such that the forwarder forwards the fourth service packet according to the second service chain information.

According to another aspect of the embodiments of the present disclosure, a service packet forwarding method is provided and includes receiving, by the forwarder, a fourth service packet sent by the classifier, where the fourth service packet includes a backhaul service packet and second service chain information, and the second service chain information is used to indicate a route of a second service chain. The fourth service packet is a packet generated by the classifier according to first service chain information and a packet characteristic of the backhaul service packet, and the first service chain information is used to indicate a route of a first service chain. The first service chain information and the backhaul service packet are information carried in a third service packet received by the classifier, and forwarding, by the forwarder, the fourth service packet according to the second service chain information.

According to the service packet forwarding method and an apparatus that are provided in the embodiments of the present disclosure, because each piece of service chain information indicates a route of one service chain, a service packet carries multiple pieces of service chain information, and routes of multiple service chains constitute an entire path for forwarding the service packet. Compared with a case of determining an entire forwarding path of the service packet using one classification rule, for each classification rule, only some packet characteristics of the service packet need to be determined. Each service packet may correspond to multiple classification rules. Compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

DESCRIPTION OF EMBODIMENTS

A service chain described in this specification includes a service implementation path, and one or multiple SF entities may be deployed in this path to jointly implement service processing on a packet. The service chain is also referred to as a service path, or the like. A CID is used to identify a specific service chain, and may also be referred to as a service chain label, or the like.

Figure 1:
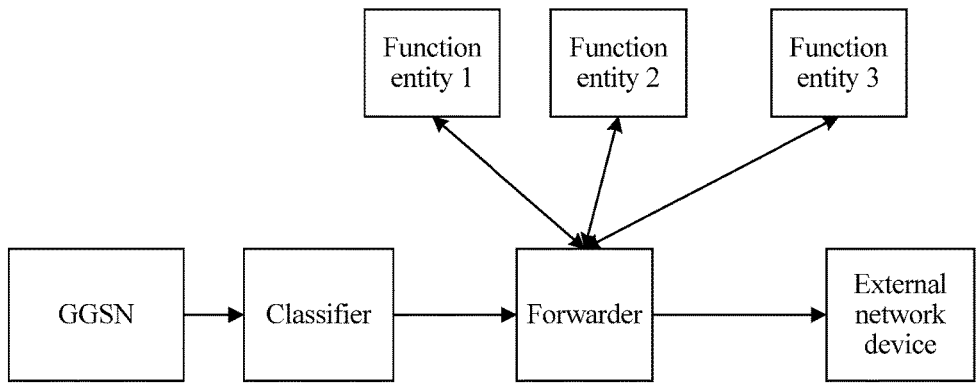
FIG. 1 is a diagram of a network topology.
Figure 2:
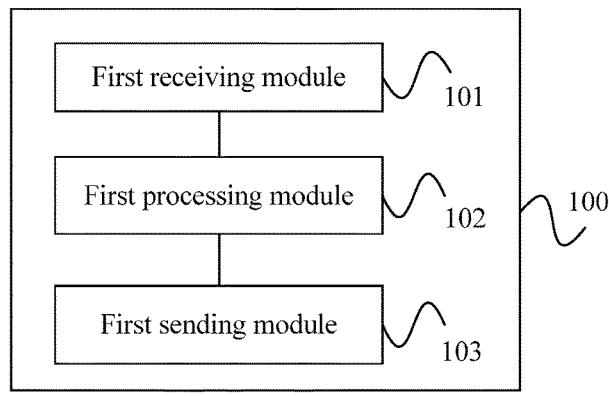
FIG. 2 is a structural diagram of a classifier according to an embodiment of the present disclosure.

FIG. 2 is a structural diagram of a classifier according to an embodiment of the present disclosure. A classifier provided in this embodiment of the present disclosure may execute a processing process provided in an embodiment of a service packet forwarding method. As shown in FIG. 2, a classifier 100 includes a first receiving module 101, a first processing module 102, and a first sending module 103. The first receiving module 101 is configured to receive a first service packet, and the first service packet includes a packet characteristic. The first processing module 102 is configured to generate a second service packet according to the packet characteristic, the second service packet includes the first service packet and at least two pieces of service chain information, and each piece of service chain information is used to indicate a route of one service chain. The first sending module 103 is configured to send the second service packet to a forwarder such that the forwarder forwards the second service packet according to the at least two pieces of service chain information.

In this embodiment of the present disclosure, because each piece of service chain information indicates a route of one service chain, a service packet carries multiple pieces of service chain information, and routes of multiple service chains constitute an entire path for forwarding the service packet, compared with a case of determining an entire forwarding path of the service packet using one classification rule, for each classification rule, only some packet characteristics of the service packet need to be determined, each service packet may correspond to multiple classification rules, compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

Based on FIG. 2, the first processing module 102 is further configured to determine the at least two pieces of service chain information according to one or at least two packet characteristics.

The service chain information includes a CID, and the CID is used to identify the service chain.

The service chain information includes the CID and service chain switching information, and the service chain switching information is used to indicate switching between the service chains.

The service chain switching information includes an SI, and the SI is used to identify a quantity of function entities corresponding to the forwarder.

The CID is represented by a sub-field of a CID field, and the CID field is included in the second service packet.

The first processing module 102 is further configured to determine a first classification rule, and match the packet characteristic with the first classification rule in order to generate the second service packet.

The first classification rule includes a first classification entry, and the first classification entry includes a first matching condition and the service chain information. The first processing module 102 is further configured to match the packet characteristic with the first matching condition corresponding to the first classification entry. The first processing module 102 is further configured to add the service chain information corresponding to the first classification entry into the first service packet in order to generate the second service packet when the packet characteristic is consistent with the first matching condition corresponding to the first classification entry.

Figure 10:
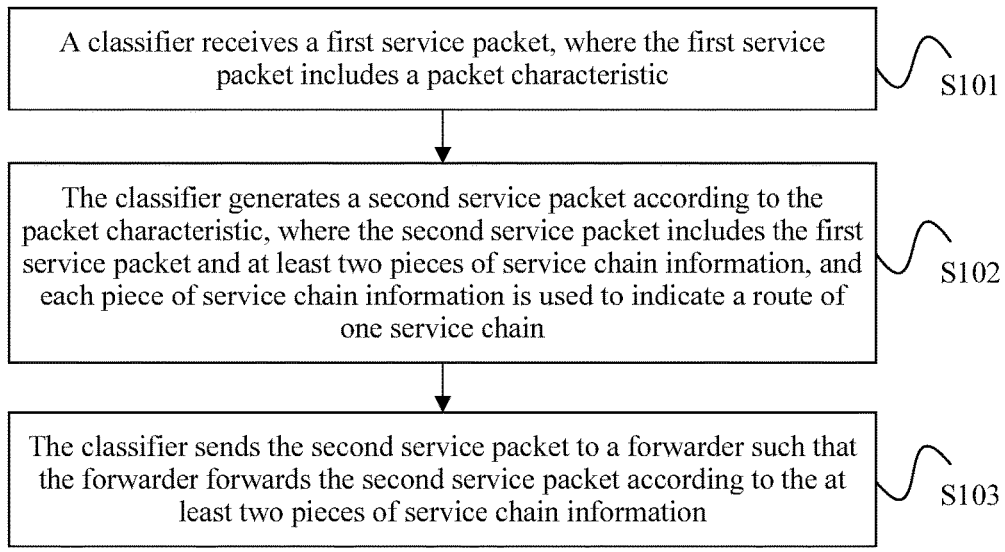
FIG. 10 is a flowchart of a service packet forwarding method according to an embodiment of the present disclosure.

The classifier provided in this embodiment of the present disclosure may be further configured to execute a method embodiment provided in the FIG. 10.

In this embodiment of the present disclosure, for each classification rule, only some packet characteristics of a service packet need to be determined, and each service packet may correspond to multiple classification rules, compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

Figure 3:
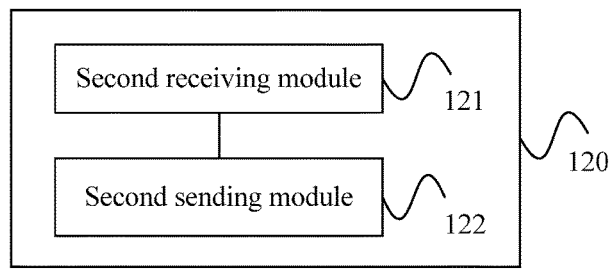
FIG. 3 is a structural diagram of a forwarder according to an embodiment of the present disclosure.

FIG. 3 is a structural diagram of a forwarder provided in an embodiment of the present disclosure. A forwarder provided in this embodiment of the present disclosure may execute a processing process provided in an embodiment of a service packet forwarding method. As shown in FIG. 3, a forwarder 120 includes a second receiving module 121 and a second sending module 122. The second receiving module 121 is configured to receive a second service packet sent by a classifier, where the second service packet includes a first service packet and at least two pieces of service chain information, each piece of service chain information is used to indicate a route of one service chain, the first service packet is a packet received by the classifier, and the first service packet includes a packet characteristic. The second sending module 122 is configured to forward the second service packet according to the at least two pieces of service chain information.

In this embodiment of the present disclosure, because each piece of service chain information indicates a route of one service chain, a service packet carries multiple pieces of service chain information, and routes of multiple service chains constitute an entire path for forwarding the service packet, compared with a case of determining an entire forwarding path of the service packet using one classification rule, for each classification rule, only some packet characteristics of the service packet need to be determined, each service packet may correspond to multiple classification rules, compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

Figure 4:
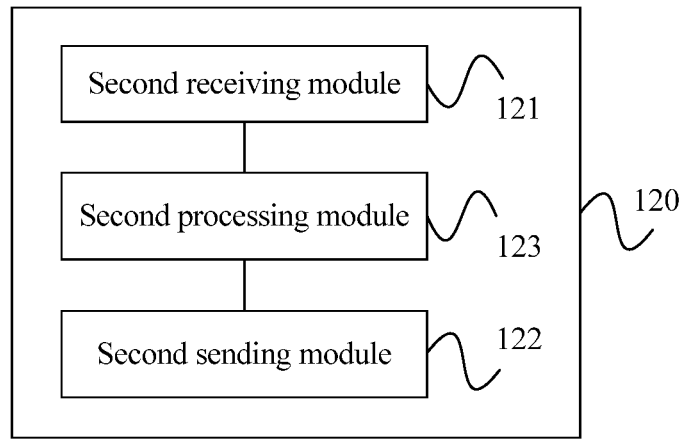
FIG. 4 is a structural diagram of a forwarder according to another embodiment of the present disclosure.

FIG. 4 is a structural diagram of a forwarder 120 according to another embodiment of the present disclosure. Based on FIG. 3, the second sending module 122 is further configured to forward the second service packet to at least one function entity according to the at least two pieces of service chain information.

As shown in FIG. 4, the forwarder 120 further includes a second processing module 123, and the second processing module 123 is configured to determine a first forwarding rule. The second sending module 122 is further configured to forward the second service packet to the at least one function entity according to the first forwarding rule and the at least two pieces of service chain information.

The service chain information includes a CID, and the CID is used to identify the service chain.

The service chain information includes the CID and service chain switching information, and the service chain switching information is used to indicate switching between the service chains.

The at least two pieces of service chain information include at least third service chain information and fourth service chain information. The second sending module 122 is further configured to forward the second service packet to one of the at least one function entity according to the third service chain information. The second receiving module 121 is further configured to receive the second service packet processed by one of the at least one function entity. The second processing module 123 is further configured to determine the fourth service chain information according to the service chain switching information. The second sending module 122 is further configured to continue to forward the second service packet according to the fourth service chain information.

The service chain switching information includes an SI. The SI is used to identify a quantity of function entities corresponding to the forwarder, and the SI is subtracted by 1 after the forwarder forwards the second service packet to the function entity.

The first forwarding rule includes a first forwarding entry, and the first forwarding entry includes a third matching condition and a function entity identifier. The second processing module 123 is further configured to match the CID of the second service packet with the third matching condition of the first forwarding entry. The second sending module 122 is further configured to send the second service packet to a function entity identified by the function entity identifier corresponding to the first forwarding entry when the CID of the second service packet matches the third matching condition of the first forwarding entry.

The second processing module 123 is further configured to delete all the service chain information if all SIs in the second service packet are subtracted to 0. The second sending module 122 is further configured to send a second service packet obtained after all the service chain information is deleted.

The third matching condition in the first forwarding rule includes a first CID field. The second processing module 123 is further configured to match a sub-field of a CID field corresponding to the CID of the second service packet with a sub-field of the first CID field in the third matching condition.

Figure 11:
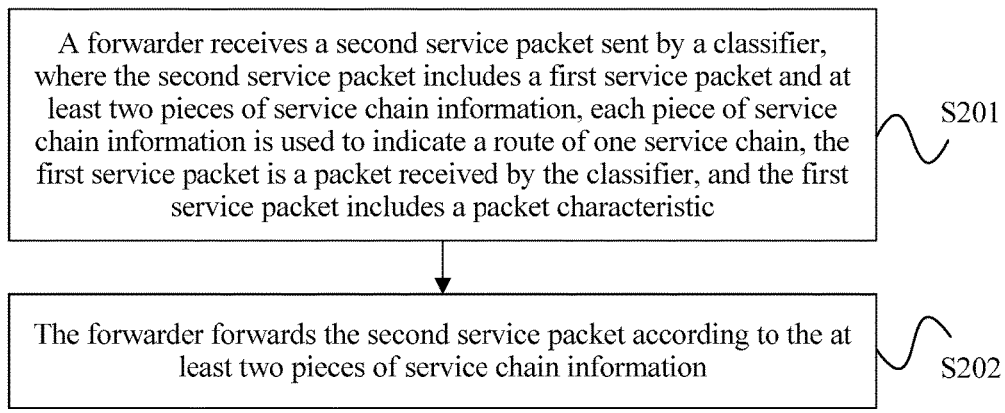
FIG. 11 is a flowchart of a service packet forwarding method according to another embodiment of the present disclosure.

The forwarder 120 provided in this embodiment of the present disclosure may be further configured to execute a method embodiment provided in the FIG. 11.

This embodiment of the present disclosure provides a method for performing packet forwarding by a forwarder according to second service packets in different forms. Each service packet may correspond to multiple classification rules, compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

Figure 5:
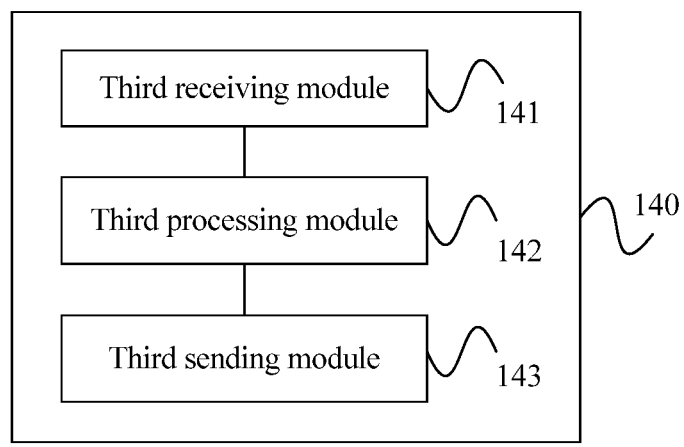
FIG. 5 is a structural diagram of a classifier according to another embodiment of the present disclosure.

FIG. 5 is a structural diagram of a classifier according to another embodiment of the present disclosure. A classifier provided in this embodiment of the present disclosure may execute a processing process provided in an embodiment of a service packet forwarding method. As shown in FIG. 5, a classifier 140 includes a third receiving module 141, a third processing module 142, and a third sending module 143. The third receiving module 141 is configured to receive a third service packet, where the third service packet includes a backhaul service packet and first service chain information, and the first service chain information is used to indicate a route of a first service chain. The third processing module 142 is configured to generate a fourth service packet according to the first service chain information and a packet characteristic of the backhaul service packet, where the fourth service packet includes the backhaul service packet and second service chain information, and the second service chain information is used to indicate a route of a second service chain. The third sending module 143 is configured to send the fourth service packet to a forwarder such that the forwarder forwards the fourth service packet according to the second service chain information.

In this embodiment of the present disclosure, because each piece of service chain information indicates a route of one service chain, service chain information carried in a service packet is changed multiple times, and routes of service chains that are changed multiple times constitute an entire path for forwarding the service packet, compared with a case of determining an entire forwarding path of the service packet using one classification rule, for each classification rule, only some packet characteristics of the service packet need to be determined, each service packet may correspond to multiple classification rules, compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

Based on FIG. 5, the third processing module 142 is further configured to determine the second service chain information according to the first service chain information and one or at least two packet characteristics of the backhaul service packet.

The first service chain information includes a first CID, and the first CID is used to identify the first service chain. The second service chain information includes a second CID, and the second CID is used to identify the second service chain.

The first service chain information includes the first CID and first service chain switching information, and the first service chain switching information is used to indicate switching between the first service chains. The second service chain information includes the second CID and second service chain switching information, and the second service chain switching information is used to indicate switching between the second service chains.

The first service chain switching information includes a first SI, and the first SI is used to identify a quantity of function entities that are corresponding to the forwarder and that are of the first service chain. The second service chain switching information includes a second SI, and the second SI is used to identify a quantity of function entities that are corresponding to the forwarder and that are of the second service chain.

The first CID is represented by a sub-field of a first CID field, and the first CID field is included in the third service packet. The second CID is represented by a sub-field of a second CID field, and the second CID field is included in the fourth service packet.

The third processing module 142 is further configured to determine a second classification rule, and match the second classification rule separately with the first service chain information and the packet characteristic of the backhaul service packet in order to generate the fourth service packet.

The second classification rule includes a second classification entry, and the second classification entry includes a second matching condition and the second service chain information. The third processing module 142 is further configured to match the first service chain information with the second matching condition corresponding to the second classification entry, and match the packet characteristic of the backhaul service packet with the second matching condition corresponding to the second classification entry. The third processing module 142 is further configured to replace the second service chain information corresponding to the second classification entry with the first service chain information, and add the first service chain information into the third service packet in order to generate the fourth service packet when the first service chain information is consistent with the second matching condition, and the packet characteristic of the backhaul service packet is consistent with the second matching condition.

The second matching condition in the second classification rule includes a part of the first CID. The third processing module 142 is further configured to match a part of the first service chain information with the part of the first CID in the second matching condition.

Figure 12:
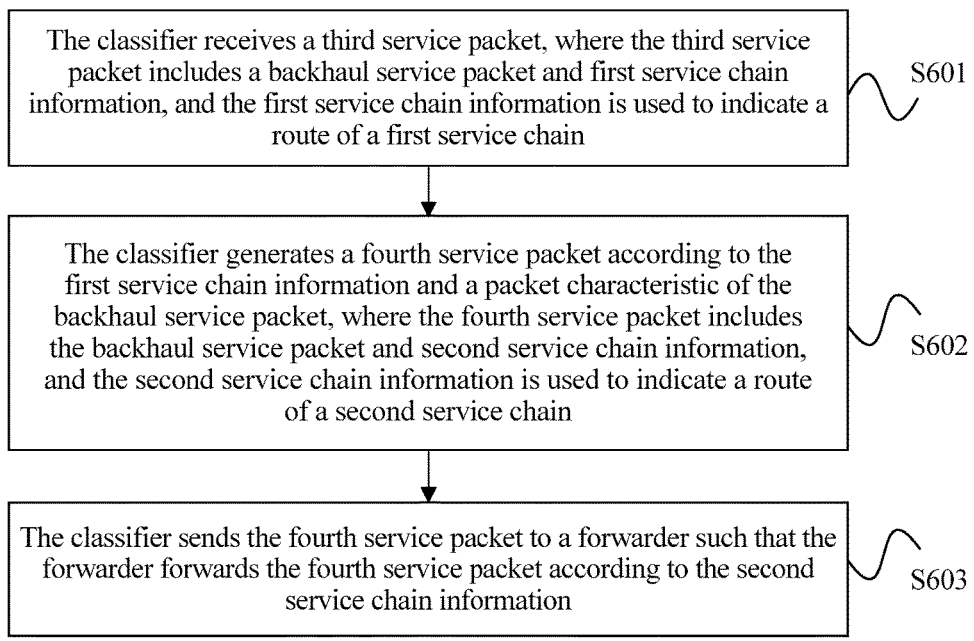
FIG. 12 is a flowchart of a service packet forwarding method according to another embodiment of the present disclosure.

The classifier 140 provided in this embodiment of the present disclosure may be further configured to execute a method embodiment provided in the FIG. 12.

This embodiment of the present disclosure provides a method for performing packet forwarding by a forwarder according to second service packets in different forms. Each service packet may correspond to multiple classification rules, compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

Figure 6:
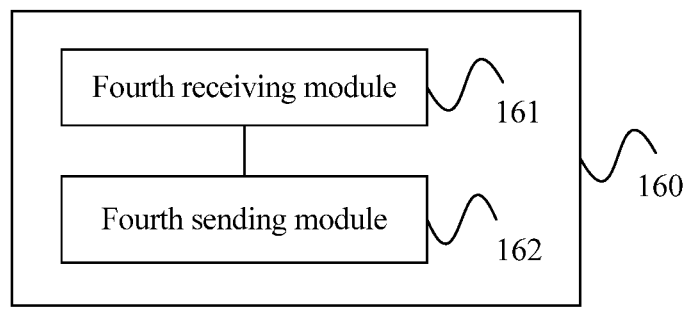
FIG. 6 is a structural diagram of a forwarder according to another embodiment of the present disclosure.

FIG. 6 is a structural diagram of a forwarder according to another embodiment of the present disclosure. A forwarder provided in this embodiment of the present disclosure may execute a processing process provided in an embodiment of a service packet forwarding method. As shown in FIG. 6, a forwarder 160 includes a fourth receiving module 161 and a fourth sending module 162. The fourth receiving module 161 is configured to receive a fourth service packet sent by the classifier, where the fourth service packet includes a backhaul service packet and second service chain information. The second service chain information is used to indicate a route of a second service chain. The fourth service packet is a packet generated by the classifier according to first service chain information and a packet characteristic of the backhaul service packet. The first service chain information is used to indicate a route of a first service chain, and the first service chain information and the backhaul service packet are information carried in a third service packet received by the classifier. The fourth sending module 162 is configured to forward the fourth service packet according to the second service chain information.

In this embodiment of the present disclosure, because each piece of service chain information indicates a route of one service chain, service chain information carried in a service packet is changed multiple times, and routes of service chains that are changed multiple times constitute an entire path for forwarding the service packet, compared with a case of determining an entire forwarding path of the service packet using one classification rule, for each classification rule, only some packet characteristics of the service packet need to be determined, each service packet may correspond to multiple classification rules, compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

Figure 7:
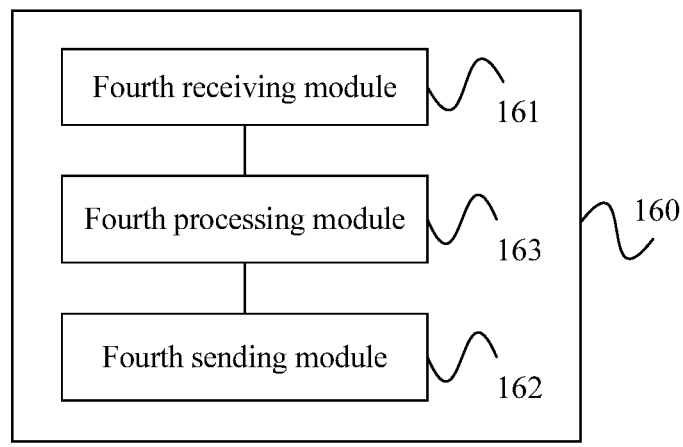
FIG. 7 is a structural diagram of a forwarder according to another embodiment of the present disclosure.

FIG. 7 is a structural diagram of a forwarder 160 according to another embodiment of the present disclosure. Based on FIG. 6, the fourth sending module 162 is further configured to forward the fourth service packet to the classifier according to the second service chain information.

As shown in FIG. 7, the forwarder 160 further includes a fourth processing module 163, and the fourth processing module 163 is configured to determine a second forwarding rule. The fourth sending module 162 is further configured to forward the fourth service packet to the classifier according to the second forwarding rule and the second service chain information.

The second service chain information includes a second CID, and the second CID is used to identify the second service chain.

The second forwarding rule includes a second forwarding entry, and the second forwarding entry includes a fourth matching condition and an identifier of the classifier. The fourth processing module 163 is further configured to match the second CID in the second service chain information with the fourth matching condition of the second forwarding entry. The fourth sending module 162 is further configured to send the fourth service packet to the classifier identified by the classifier identifier corresponding to the second forwarding entry when the second CID is consistent with the fourth matching condition of the second forwarding entry.

Figure 13:
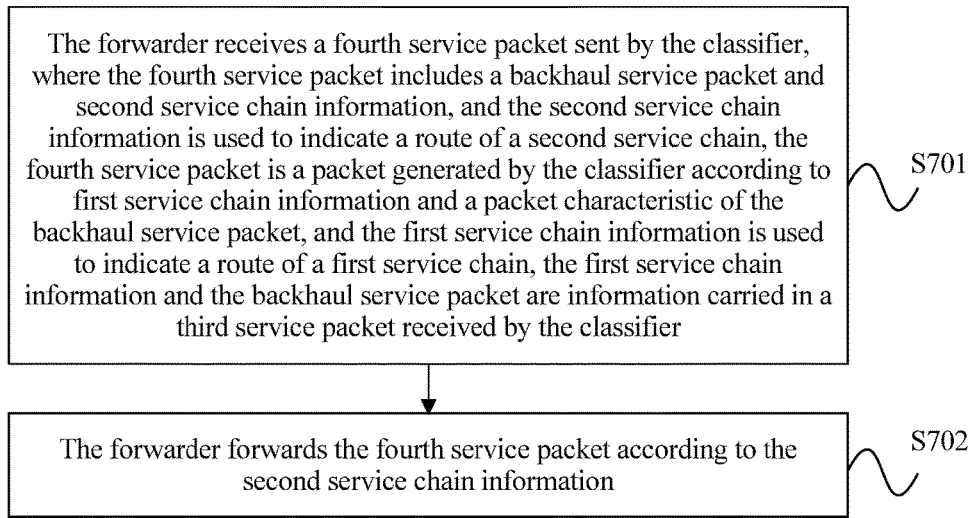
FIG. 13 is a flowchart of a service packet forwarding method according to another embodiment of the present disclosure.

The forwarder provided in this embodiment of the present disclosure may be further configured to execute a method embodiment provided in the FIG. 13.

In this embodiment of the present disclosure, because each piece of service chain information indicates a route of one service chain, service chain information carried in a service packet is changed multiple times, and routes of service chains that are changed multiple times constitute an entire path for forwarding the service packet, compared with a case of determining an entire forwarding path of the service packet using one classification rule, for each classification rule, only some packet characteristics of the service packet need to be determined, each service packet may correspond to multiple classification rules, compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

Figure 8:
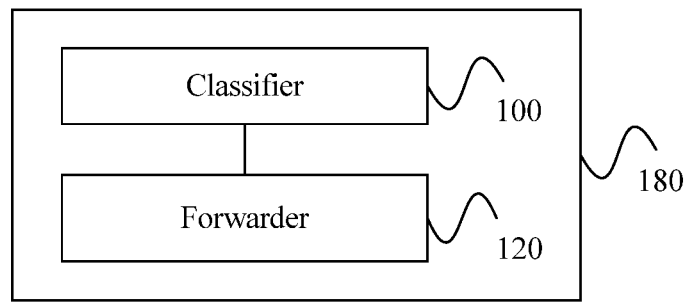
FIG. 8 is a structural diagram of a service packet forwarding system according to an embodiment of the present disclosure.

FIG. 8 is a structural diagram of a service packet forwarding system according to an embodiment of the present disclosure. The service packet forwarding system provided in this embodiment of the present disclosure may execute a processing process provided in an embodiment of a service packet forwarding method. As shown in FIG. 8, the service packet forwarding system 180 includes the classifier 100 and the forwarder 120 in the foregoing embodiments.

The service packet forwarding system 180 provided in this embodiment of the present disclosure may execute a processing process provided in an embodiment of a service packet forwarding method.

Figure 9:
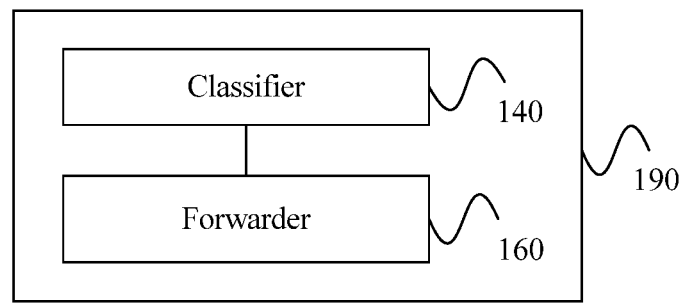
FIG. 9 is a structural diagram of a service packet forwarding system according to another embodiment of the present disclosure.

FIG. 9 is a structural diagram of a service packet forwarding system according to another embodiment of the present disclosure. The service packet forwarding system provided in this embodiment of the present disclosure may execute a processing process provided in an embodiment of a service packet forwarding method. As shown in FIG. 9, the service packet forwarding system 190 includes the classifier 140 and the forwarder 160 in the foregoing embodiments.

The service packet forwarding system 190 provided in this embodiment of the present disclosure may execute a processing process provided in an embodiment of a service packet forwarding method.

FIG. 10 is a flowchart of a service packet forwarding method according to an embodiment of the present disclosure. This embodiment of the present disclosure is applicable to forwarding a service packet according to multiple pieces of service chain information carried in the service packet. Specific steps of the service packet forwarding method are as follows.

Step S101: A classifier receives a first service packet, where the first service packet includes a packet characteristic.

The classifier receives a user uplink service packet sent by a GGSN. The service packet includes multiple packet characteristics, such as a source port number, a source IP, a destination port number, a destination IP, and a service type, and this embodiment of the present disclosure is not limited thereto.

Step S102: The classifier generates a second service packet according to the packet characteristic, where the second service packet includes the first service packet and at least two pieces of service chain information, and each piece of service chain information is used to indicate a route of one service chain.

The classifier generates the at least two pieces of service chain information according to the packet characteristic. Each piece of service chain information is used to indicate a route of one service chain, the at least two pieces of service chain information and the first service packet are encapsulated into the second service packet, and the route of the service chain is a path used by a forwarder to send the second service packet to at least one function entity.

Step S103: The classifier sends the second service packet to a forwarder such that the forwarder forwards the second service packet according to the at least two pieces of service chain information.

The classifier sends the generated second service packet to the forwarder such that the forwarder forwards the second service packet according to the at least two pieces of service chain information carried in the second service packet.

In this embodiment of the present disclosure, because each piece of service chain information indicates a route of one service chain, a service packet carries multiple pieces of service chain information, and routes of multiple service chains constitute an entire path for forwarding the service packet, compared with a case of determining an entire forwarding path of the service packet using one classification rule, for each classification rule, only some packet characteristics of the service packet need to be determined, each service packet may correspond to multiple classification rules, compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

Base on the foregoing embodiment, the classifier determines the at least two pieces of service chain information according to one or at least two packet characteristics.

The service chain information includes a CID, and the CID is used to identify the service chain.

The service chain information includes the CID and service chain switching information, and the service chain switching information is used to indicate switching between the service chains.

The service chain switching information includes an SI, and the SI is used to identify a quantity of function entities corresponding to the forwarder.

The following Table 1 is a structural diagram of the second service packet. The second service packet in this embodiment of the present disclosure includes three pieces of service chain information, and the three pieces of service chain information may be determined according to one or at least two packet characteristics of the first service packet. Each piece of service chain information, such as "CID1 SI=2," includes a CID CID1 and service chain switching information SI=2. The CID CID1 is used to identify the service chain. The service chain switching information is used to indicate switching between the service chains, and further, SI=2 is used to identify the quantity of the function entities corresponding to the forwarder. In addition, the service chain information may include only the CID, but does not include the service chain switching information.

TABLE 1

| Service chain information | |
| --- | --- |
| CID1 | SI = 2 |
| CID2 | SI = 2 |
| CID3 | SI = 1 |
| Second service packet | |

The CID is represented by a sub-field of a CID field, and the CID field is included in the second service packet.

In this embodiment of the present disclosure, the CID may further be represented by the sub-field of the CID field. As shown in the following Table 2, the second service packet includes the CID field. CID1&maska is some bits that are obtained by a CID CID1 using a mask maska and that are of CID1. CID2&maskb is some bits that are obtained by a CID CID2 using a mask maskb and that are of CID2. CID3&maskc is some bits that are obtained by a CID CID3 using a mask maskc and that are of CID3. CID 1 &maska, CID2&maskb, and CID3 &maskc are respectively a sub-field of the CID field, and CID1&maska, CID2&maskb, and CID3&maskc form the CID.

TABLE 2

| CID field | | |
|---|---|---|
| CID1&maska | CID2&maskb | CID3&maskc |
| | Second service packet | |

In addition, the second service packet may include multiple CID fields, and each CID field stores one CID. As shown in the following Table 3, a CID#1 field represents a CID field 1, and the CID#2 field represents a CID field 2. The CID field 1 stores the CID CID1, and the CID field 2 stores the CID CID3.

TABLE 3

| CID#1 field | CID1 |
|---|---|
| CID#2 field | CID3 |
| | Second service packet |

This embodiment of the present disclosure provides second service packets of different structures, to show manners in which the service chain information may be carried in the second service packet, whether the second service packet carries another information element, and whether the second service packet carries the service chain information in another encapsulation manner, which are not limited in this embodiment of the present disclosure.

Based on the foregoing embodiments, the service packet forwarding method further includes determining, by the classifier, a first classification rule. That the classifier generates a second service packet according to the packet characteristic includes matching, by the classifier, the packet characteristic with the first classification rule in order to generate the second service packet.

The first classification rule includes a first classification entry, and the first classification entry includes a first matching condition and the service chain information. That the classifier matches the packet characteristic with the first classification rule in order to generate the second service packet includes matching, by the classifier, the packet characteristic with the first matching condition corresponding to the first classification entry, and adding, by the classifier, the service chain information corresponding to the first classification entry into the first service packet in order to generate the second service packet when they are consistent.

For example, classification rules corresponding to the classifier are as follows:
1. Source port number==90, CID=CID0, SI=1;
2. Source port number==80, CID=CID1, SI=2;
3. Service type==video stream, CID=CID2, SI=2;
4. Destination IP==IP1, CID=CID3, SI=1; and
5. Destination IP==IP2, CID=CID4, SI=1.

A video stream packet whose destination IP is IP1 and source port number is 80 matches the foregoing three classification rules 2, 3, and 4. The classifier adds a correspondence between CID1 and SI=2, a correspondence between CID2 and SI=2, and a correspondence between CID3 and SI=1 into the first service packet in order to constitute the second service packet. A format of the second service packet is shown in the foregoing Table 1.

For example, classification rules determined by the classifier are as follows:
1. Source port number==80, CID|=CID1&maska; //if a source port number of the service packet is 80, the lowest 8 bits of the CID of the service packet are set as the lowest 8 bits of CID1;

2. Service type==video stream, CID|=CID2&maskb; //if the service packet is the video stream, the middle 8 bits of the CID of the service packet are set as the middle 8 bits of CID2; and 3. Destination IP==IP1, CID|=CID3&maskc; //if a destination IP of the service packet is IP1, the highest 8 bits of the CID of the service packet are set as the highest 8 bits of CID3.

CID1&maska, CID2&maskb, and CID3 &maskc are unequal.

A video stream packet whose destination IP is IP1 and source port number is 80 matches the foregoing three matching conditions. The classifier adds CID1&maska, CID2&maskb, and CID3&maskc into the first service packet in order to constitute the second service packet. A format of the second service packet is shown in the foregoing Table 2.

For example, classification rules determined by the classifier are as follows:
1. Source port number==90, CID#1=CID0; //if a source port number of the service packet is 90, CID0 is set in the CID#1 field of the service packet;
2. Source port number==80, CID#1=CID1; //if a source port number of the service packet is 80, CID1 is set in the CID#1 field of the service packet;
3. Destination IP==IP1, CID#2=CID3; //if a destination IP of the service packet is IP1, CID3 is set in the CID#2 field of the service packet; and
4. Destination IP==IP2, CID#2=CID4; //if a destination IP of the service packet is IP2, CID4 is set in the CID#2 field of the service packet.

A video stream packet whose destination IP is IP1 and source port number is 80 matches the foregoing two classification rules 2 and 3. The classifier adds CID1 into the CID#1 field of the service packet, and adds CID3 into the CID#2 field of the service packet in order to constitute the second service packet. A format of the second service packet is shown in the foregoing Table 3.

In this embodiment of the present disclosure, a classification rule may be delivered to a classifier using a controller. In addition, the classification rule may be obtained by the classifier by means of pre-configuration or from another configured network element. The classification rule is not limited to the forms in the foregoing examples, and priorities may further be set for the classification rules. Service chain information carried in a corresponding second service packet has a priority the same as the priority of the classification rule.

In this embodiment of the present disclosure, for each classification rule, only some packet characteristics of a service packet need to be determined, and each service packet may correspond to multiple classification rules, compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

FIG. 11 is a flowchart of a service packet forwarding method according to another embodiment of the present disclosure. A service packet forwarding method provided in this embodiment of the present disclosure further includes the following steps.

Step S201: A forwarder receives a second service packet sent by a classifier, where the second service packet includes a first service packet and at least two pieces of service chain information, each piece of service chain information is used to indicate a route of one service chain, the first service packet is a packet received by the classifier, and the first service packet includes a packet characteristic.

The classifier generates the at least two pieces of service chain information according to a received user uplink service packet sent by a GGSN, that is, the packet characteristic of the first service packet, encapsulates the first service packet and the at least two pieces of service chain information together to constitute the second service packet, and sends the second service packet to the forwarder.

Step S202: The forwarder forwards the second service packet according to the at least two pieces of service chain information.

The forwarder forwards the second service packet according to the at least two pieces of service chain information carries in the second service packet.

In this embodiment of the present disclosure, because each piece of service chain information indicates a route of one service chain, a service packet carries multiple pieces of service chain information, and routes of multiple service chains constitute an entire path for forwarding the service packet, compared with a case of determining an entire forwarding path of the service packet using one classification rule, for each classification rule, only some packet characteristics of the service packet need to be determined, each service packet may correspond to multiple classification rules, compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

Based on the embodiment corresponding to FIG. 11, that the forwarder forwards the second service packet according to the at least two pieces of service chain information includes forwarding, by the forwarder, the second service packet to at least one function entity according to the at least two pieces of service chain information.

The forwarder determines a first forwarding rule. That the forwarder forwards the second service packet to at least one function entity according to the at least two pieces of service chain information includes forwarding, by the forwarder, the second service packet to the at least one function entity according to the first forwarding rule and the at least two pieces of service chain information.

In this embodiment of the present disclosure, forwarding rules corresponding to the forwarder are further as follows:
Match(CID==CID0): SF3;
Match(CID==CID1): SF1, SF2;
Match(CID==CID2): SF4, SF5;
Match(CID==CID3): SF6; and
Match(CID==CID4): SF7.

If the second service packet received by the forwarder carries a CID CID1, the forwarder obtains, from the forwarding rules according to CID1, a forwarding rule "Match (CID==CID1): SF1, SF2" corresponding to CID1, and the forwarder sequentially sends the second service packet to SF1 and SF2 for processing. If the second service packet carries a CID CID3, the forwarder sends the second service packet only to SF6 for processing.

The service chain information includes a CID, and the CID is used to identify the service chain.

The service chain information includes the CID and service chain switching information, and the service chain switching information is used to indicate switching between the service chains.

A structure of the second service packet received by the forwarder may be further shown in Table 1, Table 2, and Table 3, and is not described herein.

The at least two pieces of service chain information include at least third service chain information and fourth service chain information. That the forwarder forwards the second service packet according to the at least two pieces of service chain information includes forwarding, by the forwarder, the second service packet to one of the at least one function entity according to the third service chain information, and receiving, by the forwarder, the second service packet processed by one of the at least one function entity, determining the fourth service chain information according to the service chain switching information, and continuing to forward the second service packet according to the fourth service chain information.

The service chain switching information includes an SI. The SI is used to identify a quantity of function entities corresponding to the forwarder, and the SI is subtracted by 1 after the forwarder forwards the second service packet to the function entity.

The first forwarding rule includes a first forwarding entry, and the first forwarding entry includes a third matching condition and a function entity identifier. The method further includes matching, by the forwarder, the CID of the second service packet with the third matching condition of the first forwarding entry, and when they are consistent, sending, by the forwarder, the second service packet to a function entity identified by the function entity identifier corresponding to the first forwarding entry.

An entry in the foregoing forwarding rules, such as "Match(CID=CID2): SF4, SF5," includes a matching condition Match(CID=CID2) and function entity identifiers SF4 and SF5.

After receiving the second service packet shown in Table 1, if the forwarder obtains, from the foregoing forwarding rules according to the first service chain information CID1 and an SI value that are encapsulated in the second service packet, a forwarding rule "Match(CID==CID1): SF1, SF2" corresponding to CID1, the forwarder first forwards the second service packet to SF1, and SF1 performs service processing on the second service packet, and sends the processed second service packet to the forwarder. In addition, SF1 or the forwarder subtracts 1 from an SI value corresponding to CID1 encapsulated in the second service packet such that SI=1 and the SI value is not 0. Then the forwarder continues to forward, according to CID1 and the new SI=1 and according to the forwarding rule, the second service packet to SF2 for service packet processing. When SF2 sends the processed second service packet to the forwarder, SF2 or the forwarder subtracts 1 from the SI value corresponding to CID1 encapsulated in the second service packet such that SI=0.

If all SIs in the second service packet are subtracted to 0, the forwarder deletes all the service chain information, and sends a second service packet obtained after all the service chain information is deleted.

Because the SI value corresponding to CID1 has been subtracted to 0, the forwarder switches to a next CID CID2, and sequentially forwards, according to an SI value corresponding to CID2 and a forwarding rule "Match (CID==CID2): SF4, SF5" corresponding to the CID, the service packet to SF4 and SF5 for processing. Likewise, every time after performing service processing, each SF or forwarder in this forwarding service chain subtracts 1 from the SI value corresponding to CID2, until the SI value is subtracted to 0. The forwarder switches to a CID CID3 according to same logic, and performs a forwarding rule and service processing that are corresponding to CID3. When SIs corresponding to all CIDs in a service label header are subtracted to 0, forwarding of all the CIDs is completed. The forwarder deletes a service label header encapsulated in the service packet, and sends the processed service packet to an external network device.

In addition, when detecting an SI corresponding to a CID is subtracted to 0, the forwarder or the SF may delete the CID and the corresponding SI from the service label header in order to ensure that a first CID encapsulated in the service packet is a CID for performing service forwarding. The forwarder needs to perform forwarding only according to the first CID in the service label header. When the forwarder finds that all correspondences between CIDs and SIs are deleted, it is considered that service forwarding has been completed on the service packet, and the forwarder directly sends the service packet to the external network device.

The third matching condition in the first forwarding rule includes a first CID field. That the forwarder matches the CID of the second service packet with the third matching condition of the first forwarding entry includes matching, by the forwarder, a sub-field of a CID field corresponding to the CID of the second service packet with a sub-field of the first CID field in the third matching condition.

In this embodiment of the present disclosure, forwarding rules corresponding to the forwarder may further be as follows:

1. Match(CID&maska==CID1a&maska): send to SF1; //if the lowest 8 bits of the CID of the service packet are the same as the lowest 8 bits of CID1a, the service packet is sent to SF1;
2. Match(CID&maska==CID1a&maska, input_SF==SF1): send to SF2; //if the lowest 8 bits of the CID of the service packet are the same as the lowest 8 bits of CID1a, and the service packet is sent by SF1 to the forwarder, the service packet is sent to SF2;
3. Match(CID&maska==CID1a&maska, input_SF==SF2): CID&maska=0, goto-table; //if the lowest 8 bits of the CID of the service packet are the same as the lowest 8 bits of CID1a, and the service packet is sent by SF2 to the forwarder, the lowest 8 bits of the CID of the service packet are zeroed out, and a subsequent forwarding rule is performed for re-matching;
4. Match(CID&maskb==CID1b&maskb): send to SF4;
5. Match(CID&maskb==CID1b&maskb, input_SF==SF4): send to SF5;
6. Match(CID&maskb==CID1b&maskb, input_SF==SF5): CID&maskb=0, goto-table;
7. Match(CID&maskc==CID1c&maskc): send to SF6; and
8. Match(CID&maskc==CID1c&maskc, input_SF==SF6): CID&maskb=0, goto-table.

CID1a, CID1b, and CID1c may be respectively the same as or different from CID1, CID2, and CID3.

After receiving the second service packet shown in Table 2, the forwarder matches the forwarding rules with the CID field encapsulated in the second service packet, which is further the sub-field of the CID field. If the lowest 8 bits of the CID of the second service packet are the same as the lowest 8 bits of CID1a, the second service packet is successfully matched with the forwarding rule 1, and the forwarder forwards the second service packet to SF1 for processing. The forwarder receives a second service packet returned by SF1 and performs re-matching, and further forwards the second service packet to SF2 after the second service packet is successfully matched with the forwarding rule 2.

The forwarder receives a second service packet returned by SF2, and after the second service packet is successfully matched with the forwarding rule 3, zeroes out the lowest 8 bits of the CID according to the forwarding rule 3, and then matches the second service packet with a subsequent forwarding rule according to the goto-table instruction. The forwarder sequentially sends, according to the forwarding rule 4 and the forwarding rule 5, the second service packet to SF4 and SF5 for service processing.

The forwarder receives a second service packet returned by SF5, and after the second service packet is successfully matched with the forwarding rule 6, the forwarder zeroes out the middle 8 bits of the CID again, and continues to implement matching of the subsequent forwarding rule. When all bits of the CID in the second service packet are zeroed out, the service chain information is deleted, and a second service packet obtained after the service chain information is deleted is sent to the external network device.

In addition, this embodiment of the present disclosure may further include two different forwarders (a forwarder 1 and a forwarder 2) that separately forward the second service packet. Forwarding rules in the forwarder 1 are, Match(CID#1==CID0): SF1; and Match(CID#1==CID1): SF1, SF2.

Forwarding rules in the forwarder 2 are, Match(CID#2==CID3): SF3, SF4; and Match(CID#2==CID4): SF4, SF5.

After receiving the second service packet shown in Table 3, the forwarder 1 obtains the CID in the CID#1 field of the second service packet, matches the second service packet with the forwarding rule "Match(CID#1==CID1): SF1, SF2" according to the CID in the CID#1 field, and sequentially forwards the second service packet to SF1 and SF2 for service processing. A specific forwarding process is consistent with that in the foregoing embodiment, and is not described herein. After completing second service packet forwarding based on the CID#1 field, the forwarder 1 sends the second service packet to a next-hop forwarder, that is, the forwarder 2, and the forwarder 1 may delete the CID#1 field, and save only the CID#2 field of the service packet.

After receiving the second service packet, the forwarder 2 performs matching on the CID#2 field of the second service packet, and sequentially forwards the second service packet to SF3 and SF4 for service processing. When forwarding of all second service packets is completed, the forwarder 2 may delete the CID#2 field, and send the processed second service packet to the external network device.

In this embodiment of the present disclosure, a forwarding rule may be delivered to a forwarder using a controller. In addition, the forwarding rule may be obtained by the forwarder by means of pre-configuration or from another configured network element. The forwarding rule is not limited to the forms in the foregoing examples, and priorities may further be set for the forwarding rules. A corresponding forwarder may forward the second service packet according to the priority of the forwarding rule.

This embodiment of the present disclosure provides a method for performing packet forwarding by a forwarder according to second service packets in different forms. Each service packet may correspond to multiple classification rules, compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

FIG. 12 is a flowchart of a service packet forwarding method according to another embodiment of the present disclosure. A service packet forwarding method provided in this embodiment of the present disclosure further includes the following steps.

Step S601: The classifier receives a third service packet, where the third service packet includes a backhaul service packet and first service chain information, and the first service chain information is used to indicate a route of a first service chain.

In this embodiment of the present disclosure, a classifier receives a third service packet returned by a forwarder. The third service packet includes the backhaul service packet and the first service chain information. The backhaul service packet may be the first service packet in the foregoing embodiments, or may be the first service packet processed by a function entity. The first service chain information is used to indicate a route that is of a first service chain and that is used by the forwarder to forward the backhaul service packet before the classifier receives the third service packet.

Step S602: The classifier generates a fourth service packet according to the first service chain information and a packet characteristic of the backhaul service packet, where the fourth service packet includes the backhaul service packet and second service chain information, and the second service chain information is used to indicate a route of a second service chain.

The classifier generates the second service chain information according to the first service chain information and the packet characteristic of the backhaul service packet, and replaces the first service chain information with the second service chain information to generate the fourth service packet, or adds the second service chain information into the third service packet to form the fourth service packet. The second service chain information is used to indicate a route that is of a second service chain and that is used to forward the fourth service packet. The route of the second service chain is a path used by the forwarder to send the fourth service packet to at least one function entity.

Step S603: The classifier sends the fourth service packet to a forwarder such that the forwarder forwards the fourth service packet according to the second service chain information.

The classifier sends the generated fourth service packet to the forwarder such that the forwarder forwards the fourth service packet according to the second service chain information carried in the fourth service packet.

In this embodiment of the present disclosure, because each piece of service chain information indicates a route of one service chain, service chain information carried in a service packet is changed multiple times, and routes of service chains that are changed multiple times constitute an entire path for forwarding the service packet, compared with a case of determining an entire forwarding path of the service packet using one classification rule, for each classification rule, only some packet characteristics of the service packet need to be determined, each service packet may correspond to multiple classification rules, compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

Based on the foregoing embodiment, the classifier determines the second service chain information according to the first service chain information and one or at least two packet characteristics of the backhaul service packet.

The second service chain information is determined according to the first service chain information carried in the third service packet and the one or at least two packet characteristics of the backhaul service packet. That is, the first service chain information carried in the third service packet is also used as one condition for determining the second service chain information.

The first service chain information includes a first CID, and the first CID is used to identify the first service chain. The second service chain information includes a second CID, and the second CID is used to identify the second service chain.

The first service chain information includes the first CID and first service chain switching information, and the first service chain switching information is used to indicate switching between the first service chains. The second service chain information includes the second CID and second service chain switching information, and the second service chain switching information is used to indicate switching between the second service chains.

The first service chain switching information includes a first SI, and the first SI is used to identify a quantity of function entities that are corresponding to the forwarder and that are of the first service chain. The second service chain switching information includes a second SI, and the second SI is used to identify a quantity of function entities that are corresponding to the forwarder and that are of the second service chain.

The first CID is represented by a sub-field of a first CID field, and the first CID field is included in the third service packet. The second CID is represented by a sub-field of a second CID field, and the second CID field is included in the fourth service packet.

The third service packet includes at least two pieces of first service chain information, and the first service chain information includes the first CID, or the first service chain information includes the first CID and the first service chain switching information. The first CID is used to identify the first service chain used for forwarding the backhaul service packet. The first service chain switching information indicates the switch between the first service chains, and the first service chain switching information includes the first SI. The first SI is used to identify a quantity of the function entities that are corresponding to the forwarder and that are of the first service chain. The first CID may also be represented by the sub-field of the first CID field, and the first CID field is included in the third service packet. A format of the third service packet is consistent with any one of the packet formats in Table 1, Table 2, and Table 3.

The fourth service packet includes at least two pieces of second service chain information, and the second service chain information includes the second CID, or the second service chain information includes the second CID and the second service chain switching information. The second CID is used to identify the second service chain used for forwarding the fourth service packet. The second service chain switching information indicates the switch between the second service chains, and the second service chain switching information includes the second SI. The second SI is used to identify a quantity of the function entities that are corresponding to the forwarder and that are of the second service chain. The second CID may also be represented by the sub-field of the second CID field, and the CID field is included in the fourth service packet. A format of the fourth service packet is consistent with any one of the packet formats in Table 1, Table 2, and Table 3.

The service packet forwarding method provided in this embodiment of the present disclosure further includes determining, by the classifier, a second classification rule. That the classifier generates a fourth service packet according to the first service chain information and a packet characteristic of the backhaul service packet includes matching, by the classifier, the second classification rule separately with the first service chain information and the packet characteristic of the backhaul service packet in order to generate the fourth service packet.

The second classification rule includes a second classification entry, and the second classification entry includes a second matching condition and the second service chain information. That the classifier matches the second classification rule separately with the first service chain information and the packet characteristic of the backhaul service packet in order to generate the fourth service packet includes matching, by the classifier, the first service chain information with the second matching condition corresponding to the second classification entry, and matching the packet characteristic of the backhaul service packet with the second matching condition corresponding to the second classification entry, and replacing, by the classifier, the second service chain information corresponding to the second classification entry with the first service chain information, and adding the first service chain information into the third service packet in order to generate the fourth service packet when the first service chain information is consistent with the second matching condition, and the packet characteristic of the backhaul service packet is consistent with the second matching condition.

In this embodiment of the present disclosure, classification rules corresponding to the classifier are further as follows:

1. Destination IP==IP1&CIDA, CID=CIDb1; //if a destination IP of a service packet is IP1, and a CID carried in the service packet matches CIDA, CIDb1 is set as a new CID of the service packet. CIDA herein may be a specific value (for example, CIDa1), may be a combination of multiple specific values (for example, CIDa1 or CIDa2), or may be a specific range (for example, CIDa1, mask=maskA). The CID currently carried in the service packet may be considered to meet this matching condition provided that the CID falls within a coverage area of the foregoing CIDA, which also holds true in the following.
2. Destination IP==IP2&CIDA, CID=CIDb2;
3. Source IP==IP3&CIDB, CID=CIDc1; and
4. Source IP==IP4&CIDB, CID=CIDc2.

For example, when a video stream packet whose destination IP is IP1 and source port number is 80 and that carries CIDa2, that is, the third service packet, matches "destination IP==IP1&CIDA, CID=CIDb1," the classifier replaces CIDa2 in the third service packet with CIDb1 in order to generate the fourth service packet.

The second matching condition in the second classification rule includes a part of the first CID. That the classifier matches the first service chain information with the second matching condition corresponding to the second classification entry includes matching, by the classifier, a part of the first service chain information with the part of the first CID in the second matching condition.

If the classifier receives a third service packet whose format is consistent with the format in Table 2, the second matching condition in the second classification rule includes a part of the first CID, and the classifier matches a part of the first service chain information with the part of the first CID in the second matching condition. For example, when the forwarding rule is "destination IP==IP1&(CIDA&MASKA), CID=CIDb1," the classifier performs masking on CIDa2 corresponding to the video stream packet whose destination IP is IP1 and source port number is 80 and that carries CIDa2, that is, the third service packet, to obtain CIDa2&MASKA, and matches CIDa2&MASKA with CIDA&MASKA in the forwarding rule.

In this embodiment of the present disclosure, a classification rule may be delivered to a classifier using a controller. In addition, the classification rule may be obtained by the classifier by means of pre-configuration or from another configured network element. The classification rule is not limited to the forms in the foregoing examples, and priorities may further be set for the classification rules. Service chain information carried in a corresponding second service packet follows a priority the same as the priority of the classification rule.

In this embodiment of the present disclosure, because each piece of service chain information indicates a route of one service chain, service chain information carried in a service packet is changed multiple times, and routes of service chains that are changed multiple times constitute an entire path for forwarding the service packet, compared with a case of determining an entire forwarding path of the service packet using one classification rule, for each classification rule, only some packet characteristics of the service packet need to be determined, each service packet may correspond to multiple classification rules, compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

FIG. 13 is a flowchart of a service packet forwarding method according to another embodiment of the present disclosure. A service packet forwarding method provided in this embodiment of the present disclosure further includes the following steps.

Step S701: The forwarder receives a fourth service packet sent by the classifier, where the fourth service packet includes a backhaul service packet and second service chain information, and the second service chain information is used to indicate a route of a second service chain, the fourth service packet is a packet generated by the classifier according to first service chain information and a packet characteristic of the backhaul service packet, and the first service chain information is used to indicate a route of a first service chain, the first service chain information and the backhaul service packet are information carried in a third service packet received by the classifier.

In this embodiment of the present disclosure, a classifier receives a third service packet returned by a forwarder. The third service packet includes the backhaul service packet and the first service chain information. The backhaul service packet may be the first service packet in the foregoing embodiments, or may be the first service packet processed by a function entity. The first service chain information is used to indicate a route that is of a first service chain and that is used by the forwarder to forward the backhaul service packet before the classifier receives the third service packet.

The classifier generates the second service chain information according to the first service chain information and the packet characteristic of the backhaul service packet, and replaces the first service chain information with the second service chain information to generate the fourth service packet, or adds the second service chain information into the third service packet to form the fourth service packet. The second service chain information is used to indicate a route that is of a second service chain and that is used to forward the fourth service packet. The route of the second service chain is a path used by the forwarder to send the fourth service packet to at least one function entity.

Step S702: The forwarder forwards the fourth service packet according to the second service chain information.

The classifier sends the generated fourth service packet to the forwarder such that the forwarder forwards the fourth service packet according to the second service chain information carried in the fourth service packet.

In this embodiment of the present disclosure, because each piece of service chain information indicates a route of one service chain, service chain information carried in a service packet is changed multiple times, and routes of service chains that are changed multiple times constitute an entire path for forwarding the service packet, compared with a case of determining an entire forwarding path of the service packet using one classification rule, for each classification rule, only some packet characteristics of the service packet need to be determined, each service packet may correspond to multiple classification rules, compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

Based on the foregoing embodiment, that the forwarder forwards the fourth service packet according to the second service chain information includes forwarding, by the forwarder, the fourth service packet to the classifier according to the second service chain information.

In this embodiment of the present disclosure, the forwarder may forward the fourth service packet to the classifier according to the second service chain information.

The service packet forwarding method further includes determining, by the forwarder, a second forwarding rule. That the forwarder forwards the fourth service packet to the classifier according to the second service chain information includes forwarding, by the forwarder, the fourth service packet to the classifier according to the second forwarding rule and the second service chain information.

The second service chain information includes a second CID, and the second CID is used to identify the second service chain.

The second forwarding rule includes a second forwarding entry, and the second forwarding entry includes a fourth matching condition and an identifier of the classifier. That the forwarder forwards the fourth service packet to the classifier according to the second forwarding rule and the second service chain information includes matching, by the forwarder, the second CID in the second service chain information with the fourth matching condition of the second forwarding entry, and when they are consistent, sending, by the forwarder, the fourth service packet to the classifier identified by the classifier identifier corresponding to the second forwarding entry.

In this embodiment of the present disclosure, forwarding rules corresponding to the forwarder are further as follows:
1. Match(CID==CIDa1): SF1, SF2, classifier identifier;
2. Match(CID==CIDa2): SF1, classifier identifier;
3. Match(CID==CIDb1): SF3, SF4, classifier identifier;
4. Match(CID==CIDb2): SF4, SF5;
5. Match(CID==CIDc1): SF6, classifier identifier; and
6. Match(CID==CIDc2): SF6, SF7.

If the forwarder receives a third service packet that carries CIDa2, the forwarder sends the third service packet to SF1 according to the forwarding rule 2, and sends a third service packet returned by SF1 to the classifier. If the forwarder receives a third service packet that carries CIDb1, the forwarder sequentially sends the third service packet to SF3 and SF4 according to the forwarding rule 3, and sends a third service packet returned by SF4 to the classifier such that the classifier continues to match the third service packet and a subsequent classification rule according to the packet characteristic of the backhaul service packet carried in the third service packet and CIDb1 carried in the third service packet. If a classification rule "source IP==IP4&CIDB, CID=CIDc2" is matched, the classifier replaces CIDb1 in the third service packet with CIDc2 to generate the fourth service packet, and sends the fourth service packet to the forwarder. The forwarder learns, by means of determining, that the fourth service packet matches "Match (CID==CIDc2): SF6, SF7," and sends the fourth service packet to SF6 and SF7 for processing. Because the forwarding rule does not include the classifier identifier, the forwarder sends, to an external network device, a fourth service packet returned by SF7.

In this embodiment of the present disclosure, a forwarding rule may be delivered to a forwarder using a controller. In addition, the forwarding rule may be obtained by the forwarder by means of pre-configuration or from another configured network element. The forwarding rule is not limited to the forms in the foregoing examples, and priorities may further be set for the forwarding rules. A corresponding forwarder may forward the second service packet according to the priority of the forwarding rule.

In this embodiment of the present disclosure, because each piece of service chain information indicates a route of one service chain, service chain information carried in a service packet is changed multiple times, and routes of service chains that are changed multiple times constitute an entire path for forwarding the service packet, compared with a case of determining an entire forwarding path of the service packet using one classification rule, for each classification rule, only some packet characteristics of the service packet need to be determined, each service packet may correspond to multiple classification rules, compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

Figure 14:
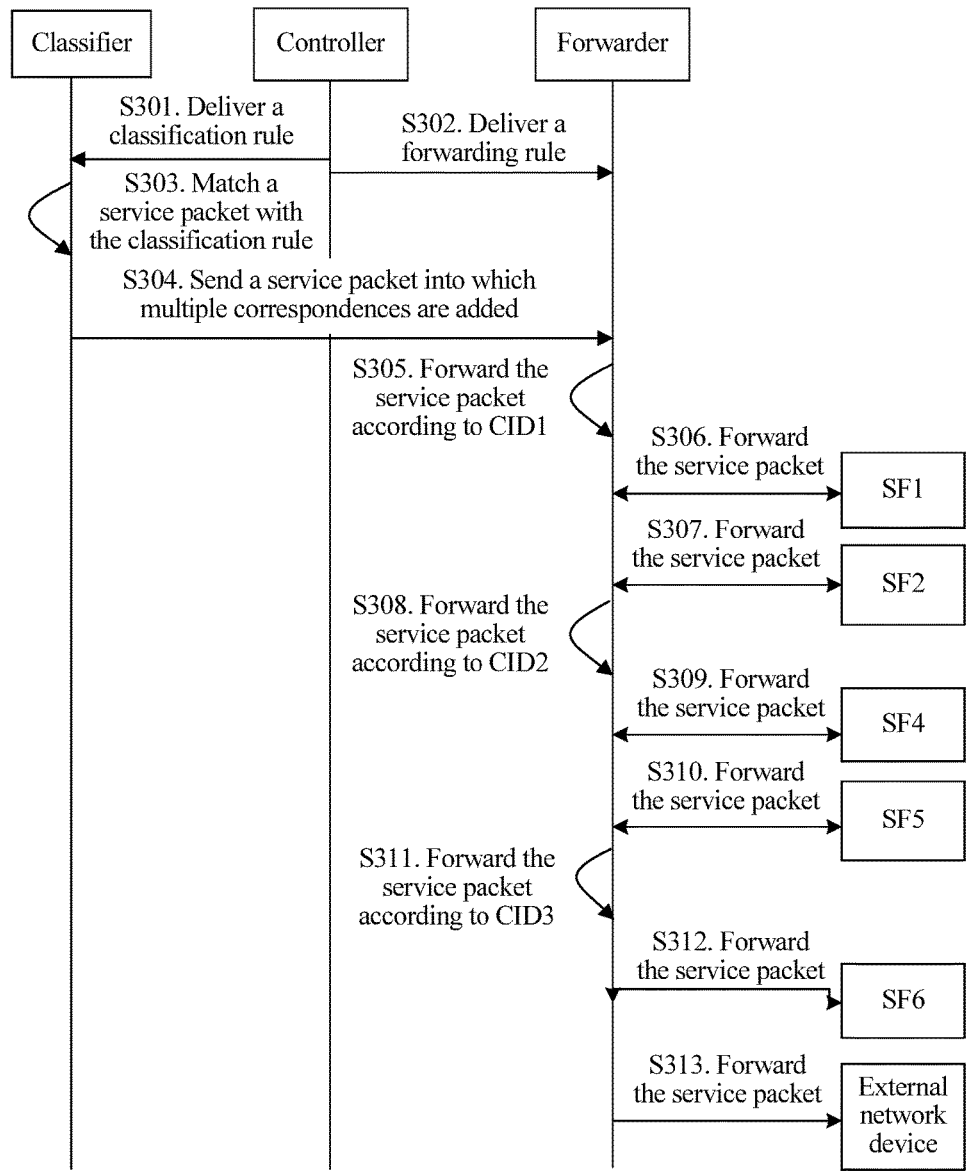
FIG. 14 is a signaling diagram applicable to a service packet forwarding method according to another embodiment of the present disclosure.

FIG. 14 is a signaling diagram applicable to a service packet forwarding method according to another embodiment of the present disclosure. A service packet forwarding method provided in this embodiment of the present disclosure includes the following steps.

Step S301: A controller delivers a classification rule to a classifier.

Step S302: The controller delivers a forwarding rule to a forwarder.

A sequence for executing steps S301 and S302 is not limited in this embodiment of the present disclosure.

Step S303: The classifier matches a service packet with the classification rule.

The classifier matches a packet characteristic value of the service packet with a matching condition in the classification rule, for example, the classifier matches a video stream packet whose destination IP is IP1 and source port number is 80 with the three classification rules 2, 3, and 4 in the embodiments of the present disclosure.

Step S304: The classifier sends, to the forwarder, a service packet into which multiple correspondences are added.

The classifier adds, into the service packet, a correspondence between CID1 and SI=2, a correspondence between CID2 and SI=2, and a correspondence between CID3 and SI=1 that are in the three classification rules 2, 3, and 4, and sends the service packet to the forwarder.

Step S305: The forwarder forwards the service packet according to CID1.

The forwarder obtains, according to CID1, a forwarding rule corresponding to CID1, and learns, by means of determining, that the service packet needs to be processed by SF1 and SF2.

Step S306: Forward the service packet between the forwarder and SF1.

The forwarder sends the service packet to SF1 such that SF1 processes the service packet and returns the processed service packet to the forwarder.

Step S307: Forward the service packet between the forwarder and SF2.

The forwarder switches to SF2 and sends the service packet to SF2 such that SF2 processes the service packet and returns the processed service packet to the forwarder.

Step S308: The forwarder forwards the service packet according to CID2.

The forwarder determines that a next CID is CID2, and CID2 corresponds to SF4 and SF5.

Step S309: Forward the service packet between the forwarder and SF4.

The forwarder sends the service packet to SF4 such that SF4 processes the service packet and returns the processed service packet to the forwarder.

Step S310: Forward the service packet between the forwarder and SF5.

The forwarder sends the service packet to SF5 such that SF5 processes the service packet and returns the processed service packet to the forwarder.

Step S311: The forwarder forwards the service packet according to CID3.

The forwarder determines that a next CID is CID3, and CID3 corresponds to SF6.

Step S312: Forward the service packet between the forwarder and SF6.

The forwarder sends the service packet to SF6 such that SF6 processes the service packet and returns the processed service packet to the forwarder.

Step S313: The forwarder sends the service packet to an external network device.

The forwarder sends the service packet to the external network device when there is no next CID.

In this embodiment of the present disclosure, multiple correspondences between CIDs and SIs are added into a service packet such that a forwarder switches forwarding service chains corresponding to multiple CIDs when forwarding the service packet.

Figure 15:
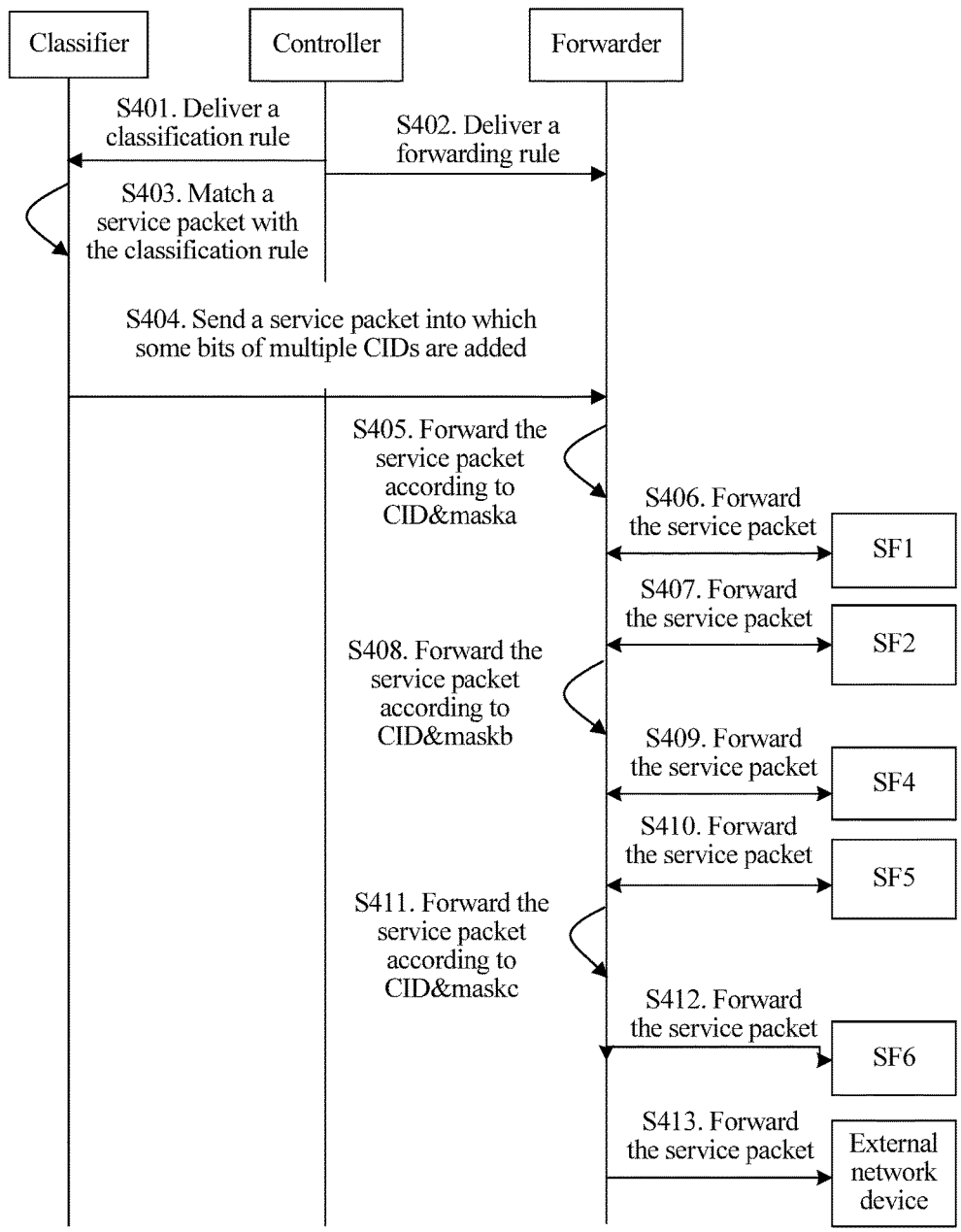
FIG. 15 is a signaling diagram applicable to a service packet forwarding method according to another embodiment of the present disclosure.

FIG. 15 is a signaling diagram applicable to a service packet forwarding method according to another embodiment of the present disclosure. A service packet forwarding method provided in this embodiment of the present disclosure includes the following steps.

Step S401: A controller delivers a classification rule to a classifier.

Step S402: The controller delivers a forwarding rule to a forwarder.

A sequence for executing steps S401 and S402 is not limited in this embodiment of the present disclosure.

Step S403: The classifier matches a service packet with the classification rule.

A video stream packet whose destination IP is IP1 and source port number is 80 is matched with three classification rules in the embodiments of the present disclosure.

Step S404: The classifier sends, to the forwarder, a service packet into which some bits of multiple CIDs are added.

The classifier separately performs an AND operation on the CIDs in the three classification rules and corresponding masks in order to constitute a second CID, adds the CID into the service packet, and sends the service packet to the forwarder.

Step S405: The forwarder forwards the service packet according to CID&maska.

The forwarder obtains a forwarding rule corresponding to CID&maska, and learns, by means of determining, that the service packet needs to be processed by SF1 and SF2.

Step S406: Forward the service packet between the forwarder and SF1.

Step S407: Forward the service packet between the forwarder and SF2.

Step S408: The forwarder forwards the service packet according to CID&maskb.

The forwarder obtains a forwarding rule corresponding to CID&maskb, and learns, by means of determining, that the service packet needs to be processed by SF4 and SF5.

Step S409: Forward the service packet between the forwarder and SF4.

Step S410: Forward the service packet between the forwarder and SF5.

Step S411: The forwarder forwards the service packet according to CID&maskc.

The forwarder obtains a forwarding rule corresponding to CID&maskc, and learns, by means of determining, that the service packet needs to be processed by SF6.

Step S412: Forward the service packet between the forwarder and SF6.

Step S413: The forwarder sends the service packet to an external network device.

The forwarder sends the service packet to the external network device after learning, by means of determining, that all bits of a CID in a service label header are zeroed out.

Steps S406, S407, S409, S410, and S412 are respectively the same as steps S306, S307, S309, S310, and S312 in the foregoing embodiment, and details are not described herein again.

In this embodiment of the present disclosure, some bits of multiple CIDs are added into a service packet, which reduces storage space of a service label header.

Figure 16:
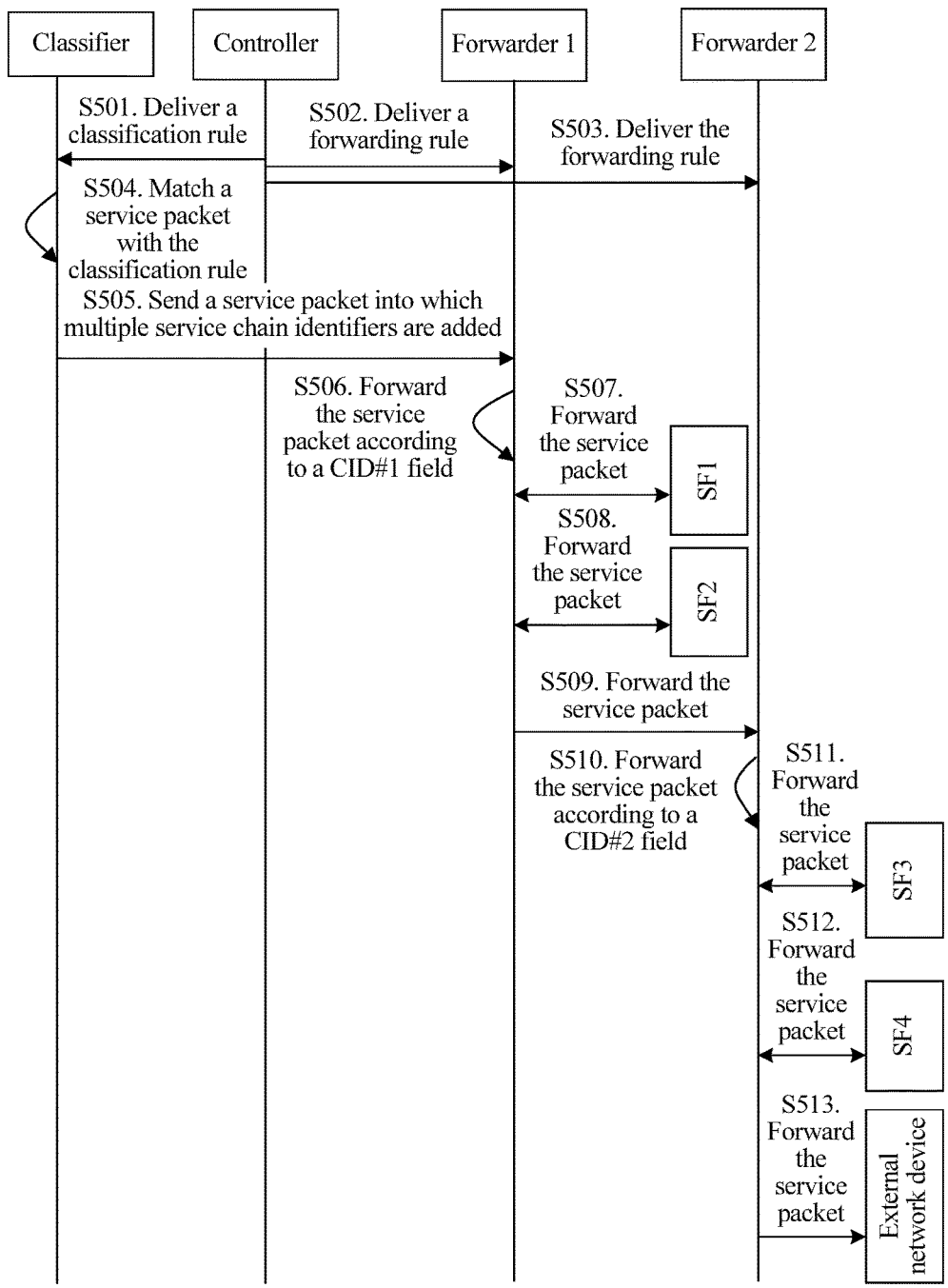
FIG. 16 is a signaling diagram applicable to a service packet forwarding method according to another embodiment of the present disclosure.

FIG. 16 is a signaling diagram applicable to a service packet forwarding method according to another embodiment of the present disclosure. A service packet forwarding method provided in this embodiment of the present disclosure includes the following steps.

Step S501: A controller delivers a classification rule to a classifier.

Step S502: The controller delivers a forwarding rule to a forwarder 1.

Step S503: The controller delivers the forwarding rule to a forwarder 2.

A sequence for executing steps S501, S502, and S503 is not limited in this embodiment of the present disclosure.

Step S504: The classifier matches a service packet with the classification rule.

For example, a video stream packet whose destination IP is IP1 and source port number is 80 is matched with the foregoing two classification rules 2, and 3.

Step S505: The classifier sends, to a forwarder 1, a service packet into which multiple CIDs are added.

The classifier adds CID1 into a CID#1 field of the service packet, adds CID3 into a CID#2 field of the service packet, and sends, to the forwarder 1, the service packet into which CID1 and CID3 are added.

Step S506: The forwarder 1 forwards the service packet according to a CID#1 field.

The forwarder 1 obtains, according to CID1 in the CID#1 field of the service packet, a forwarding rule corresponding to CID1, and learns, by means of determining, that the service packet needs to be processed by SF1 and SF2.

Step S507: Forward the service packet between the forwarder 1 and SF1.

Step S508: Forward the service packet between the forwarder 1 and SF2.

Step S509: The forwarder 1 forwards the service packet to the forwarder 2.

After completing service packet forwarding based on the CID#1 field of the service packet, the forwarder 1 sends the service packet to the forwarder 2.

Step S510: The forwarder 2 forwards the service packet according to a CID#2 field.

The forwarder 2 obtains, according to CID3 in the CID#2 field of the service packet, a forwarding rule corresponding to CID3, and learns, by means of determining, that the service packet needs to be processed by SF3 and SF4.

Step S511: Forward the service packet between the forwarder 2 and SF3.

Step S512: Forward the service packet between the forwarder 2 and SF4.

Step S513: The forwarder 2 sends the service packet to an external network device.

The forwarder 2 sends the service packet to the external network device when learning, by means of determining, that there is no CID in the service packet.

In this embodiment of the present disclosure, different CID fields of a service packet are identified using different forwarders, and the service packet are forwarded in segments by different forwarders, which provides service packet forwarding efficiency.

Figure 17:
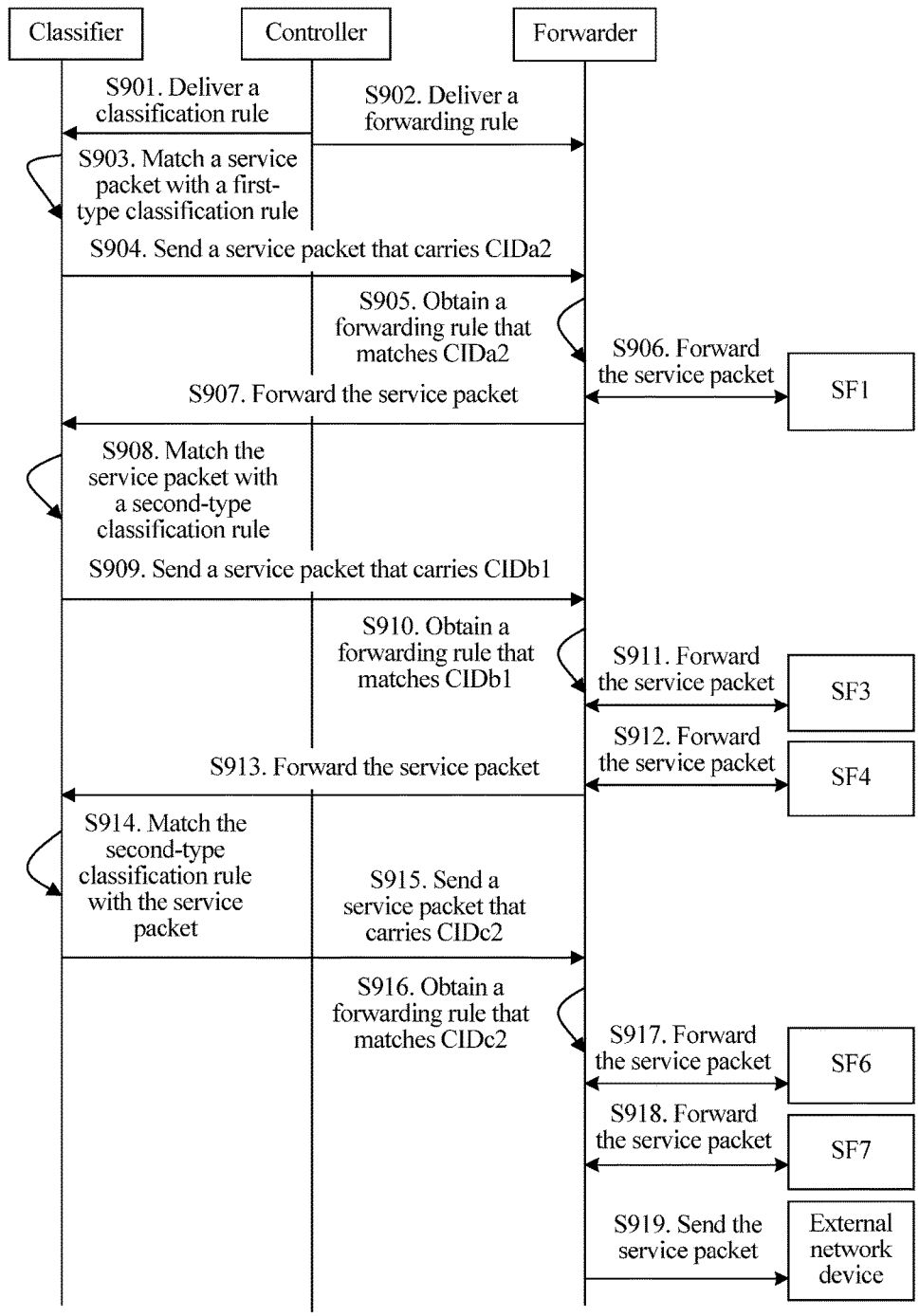
FIG. 17 is a signaling diagram applicable to a service packet forwarding method according to another embodiment of the present disclosure.

FIG. 17 is a signaling diagram applicable to a service packet forwarding method according to another embodiment of the present disclosure. A service packet described in this embodiment of the present disclosure is a video stream packet whose source IP is IP4, destination IP is IP1, and source port number is 80. A service packet forwarding method includes the following steps.

Step S901: A controller delivers a classification rule to a classifier.

Step S902: The controller delivers a forwarding rule to a forwarder.

A sequence for executing steps S901 and S902 is not limited in this embodiment of the present disclosure.

Step S903: The classifier matches a service packet with a first-type classification rule.

If a service packet received by the classifier does not carry a CID, the classifier matches the service packet with the first-type classification rule, and a classification rule "source port number==80, CID=CIDa2" is matched.

Step S904: The classifier sends, to the forwarder, a service packet that carries CIDa2.

The classifier sets CIDa2 as the CID of the service packet, and sends the service packet to the forwarder.

Step S905: The forwarder obtains a forwarding rule that matches CIDa2.

The forwarder matches the service packet with the forwarding rule, and learns, by means of determining, that the service packet needs to be forwarded to SF1 and the classifier.

Step S906: Forward the service packet between the forwarder and SF1.

Step S907: The forwarder forwards the service packet to the classifier.

Step S908: The classifier matches the service packet with a second-type classification rule.

If a service packet received by the classifier carries a CID, the classifier matches the service packet with the second-type classification rule, and a classification rule "destination IP==IP1&CIDA, CID=CIDb1" is matched.

Step S909: The classifier sends, to the forwarder, a service packet that carries CIDb1.

The classifier replaces CIDa2 of the service packet with CIDb1, and sends the service packet to the forwarder.

Step S910: The forwarder obtains a forwarding rule that matches CIDb1.

The forwarder matches the service packet with the forwarding rule, and learns, by means of determining, that the service packet needs to be forwarded to SF3, SF4, and the classifier.

Step S911: Forward the service packet between the forwarder and SF3.

Step S912: Forward the service packet between the forwarder and SF4.

Step S913: The forwarder forwards the service packet to the classifier.

Step S914: The classifier matches the service packet with the second-type classification rule.

If a service packet received by the classifier carries a CID, the classifier matches the service packet with the second-type classification rule, and a classification rule "source IP==IP4&CIDB, CID=CIDc2" is matched.

Step S915: The classifier sends, to the forwarder, a service packet that carries CIDc2.

The classifier replaces CIDb1 of the service packet with CIDc2, and sends the service packet to the forwarder.

Step S916: The forwarder obtains a forwarding rule that matches CIDc2.

The forwarder matches the service packet with the forwarding rule, and learns, by means of determining, that the service packet needs to be forwarded to SF6 and SF7.

Step S917: Forward the service packet between the forwarder and SF6.

Step S918: Forward the service packet between the forwarder and SF7.

Step S919: The forwarder sends the service packet to an external network device.

Because the forwarding rule that matches CIDc2 does not include the classifier, the forwarder sends, to the external network device, a service packet returned by SF7.

In this embodiment of the present disclosure, one matching condition of a classification rule is used to determine only one packet characteristic or several packet characteristics of a service packet, and not all packet characteristics of the service packet need to be determined, which reduces entries of classification rules, correspondingly reduces entries of forwarding rules, and saves storage resources.

In conclusion, in this embodiment of the present disclosure, because each piece of service chain information indicates a route of one service chain, a service packet carries multiple pieces of service chain information, and routes of multiple service chains constitute an entire path for forwarding the service packet, or service chain information carried in a service packet is changed multiple times, and routes of service chains that are changed multiple times constitute an entire path for forwarding the service packet, compared with a case of determining an entire forwarding path of the service packet using one classification rule, for each classification rule, only some packet characteristics of the service packet need to be determined, each service packet may correspond to multiple classification rules, compared with a case in which each service packet can correspond only to one classification rule, there is no need to set all permutations and combinations of possible target values of packet characteristics in the classification rule, which greatly reduces a quantity of classification rules, correspondingly reduces a quantity of forwarding rules and control signaling, and saves storage resources and control signaling path resources.

In the several embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

The integrated unit may be stored in a computer-readable storage medium when the foregoing integrated unit is implemented in a form of a software functional unit. The foregoing software functional unit is stored in a storage medium and includes several instructions for instructing a computer device, which may be a personal computer, a server, or a network device, or a processor to perform some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A service packet forwarding method implemented by a forwarder, the method comprising:
    receiving from a classifier a second service packet comprising a first service packet and at least two pieces of service chain information, each piece of service chain information indicating a route of one service chain, the routes of all the service chains forming an entire path for forwarding the second service packet, the first service packet comprising a plurality of packet characteristics, and each of the packet characteristics corresponding to a classification rule such that the second service packet corresponds to a plurality of classification rules; and
    forwarding the second service packet according to the at least two pieces of service chain information.

2. The method of claim 1, wherein forwarding the second service packet comprises forwarding the second service packet to at least one function entity according to the at least two pieces of service chain information.

3. The method of claim 1, wherein the pieces of service chain information comprise a service chain identifier identifying a service chain.

4. The method of claim 3, wherein the pieces of service chain information further comprise service chain switching information indicating switching between service chains.

5. The method of claim 4, wherein the pieces of service chain switching information comprise a service index identifying a quantity of function entities corresponding to the forwarder.

6. The method of claim 3, wherein the second service packet comprises a service chain identifier field, the service chain identifier field comprising a sub-field, and the sub-field representing the service chain identifier.

7. The method of claim 1, wherein the classification rules comprise a first classification rule that matches a source port number to a first service chain identifier, a second classification rule that matches a service type to a second service chain identifier, and a third classification rule that matches a destination Internet Protocol (IP) address to a third service chain identifier.

8. A forwarder comprising:
a memory; and
a processor coupled to the memory and configured to:
receive from a classifier a second service packet comprising a first service packet and at least two pieces of service chain information, each piece of service chain information indicating a route of one service chain, the routes of all the service chains forming an entire path for forwarding the second service packet, the first service packet comprising a plurality of packet characteristics, and each of the packet characteristics corresponding to a classification rule such that the second service packet corresponds to a plurality of classification rules; and
forward the second service packet according to the at least two pieces of service chain information.

9. The forwarder of claim 8, wherein the processor is further configured to further forward the second service packet to at least one function entity according to the at least two pieces of service chain information.

10. The forwarder of claim 8, wherein the pieces of service chain information comprise a service chain identifier identifying a service chain.

11. The forwarder of claim 10, wherein the service chain information further comprises service chain switching information indicating switching between service chains.

12. The forwarder of claim 11, wherein the pieces of service chain switching information comprises a service index identifying a quantity of function entities corresponding to the forwarder.

13. The forwarder of claim 10, wherein the second service packet comprises a service chain identifier field, the service chain identifier field comprising a sub-field, and the sub-field representing the service chain identifier.

14. The forwarder of claim 8, wherein the classification rules comprise a first classification rule that matches a source port number to a first service chain identifier, a second classification rule that matches a service type to a second service chain identifier, and a third classification rule that matches a destination Internet Protocol (IP) address to a third service chain identifier.

15. A classifier comprising:
a memory; and
a processor coupled to the memory and configured to:
receive a first service packet comprising a plurality of packet characteristics; and
generate a second service packet according to the packet characteristics, each of the packet characteristics corresponding to a classification rule such that the second service packet corresponds to a plurality of classification rules, the second service packet comprising the first service packet and at least two pieces of service chain information, each piece of service chain information indicating a route of one service chain, and the routes of all the service chains forming an entire path for forwarding the second service packer, and
a transmitter coupled to the processor and configured to send the second service packet to a forwarder such that the forwarder is able to forward the second service packet according to the at least two pieces of service chain information.

16. The classifier of claim 15, wherein the processor is further configured to determine the at least two pieces of service chain information according to the packet characteristics.

17. The classifier of claim 15, wherein the pieces of service chain information comprise a service chain identifier identifying a service chain.

18. The classifier of claim 17, wherein the pieces of service chain information further comprise service chain switching information indicating switching between service chains.

19. The classifier of claim 18, wherein the pieces of service chain switching information comprise a service index identifying a quantity of function entities corresponding to the forwarder.

20. The classifier of claim 17, wherein the second service packet comprises a service chain identifier field, the service chain identifier field comprising a sub-field, and the sub-field representing the service chain identifier.

* * * * *

UNITED STATES PATENT AND TRADEMARK OFFICE
CERTIFICATE OF CORRECTION

PATENT NO. : 10,250,501 B2
APPLICATION NO. : 15/410885
DATED : April 2, 2019
INVENTOR(S) : Hui Ni Page 1 of 1

It is certified that error appears in the above-identified patent and that said Letters Patent is hereby corrected as shown below:

Page 2, Other Publications, second column last two lines should read:
Foreign Communication From A Counterpart Application, PCT Application No. PCT/CN2014/082809, English Translation of Written Opinion dated April 29, 2015, 8 pages.

Signed and Sealed this
Eighteenth Day of June, 2019

Andrei Iancu
*Director of the United States Patent and Trademark Office*